Oct. 13, 1970  D. S. MACY  3,533,637

COLLET ATTACHMENT FOR POWER TOOLS

Filed May 16, 1968

INVENTOR:
DAVID S. MACY
BY Gravely, Lieder & Woodruff
ATTORNEYS.

United States Patent Office 3,533,637
Patented Oct. 13, 1970

3,533,637
COLLET ATTACHMENT FOR POWER TOOLS
David S. Macy, Creve Coeur, Mo., assignor to Stroco, Inc., St. Louis, Mo., a corporation of Missouri
Filed May 16, 1968, Ser. No. 729,613
Int. Cl. B23b 31/20, 31/10
U.S. Cl. 279—53        8 Claims

ABSTRACT OF THE DISCLOSURE

A collet attachment which threads into the drive head of a power tool and is provided with flexible jaws for gripping rotatable tools. The external surfaces of the jaws are tapered and an annular element slides forward upon the tapered surfaces responsive to relative rotation between the rotatable tool and drive head, whereby the annular element forces the jaws inwardly into gripping engagement with the rotatable tool.

---

This invention relates in general to power tool collets and, more particularly, to self-tightening collets for holding rotatable tools.

Many power tools are normally provided with chucks for gripping drills or other rotatable tools of varying sizes. As used herein, a simple form of chuck is called a collet, but the two devices perform about the same function. These chucks in most instances require special locking wrenches to lock the tools within them or to otherwise enable them to grip such tools. This is not only a time consuming procedure, but the seat and general disposition of the tool within the chuck is dependent on the manner in which the operator manipulates the locking wrench. Moreover, conventional chucks are relatively large and are therefore not entirely suitable for use with power tools which are designed for drilling or other operations in confined spaces.

One of the principal objects of the present invention is to provide a collet which tightens its grap on a tool held by it as the tool is rotated. Another object is to provide a collet which automatically centers tools inserted into it. A further object is to provide a collet which is simple and rugged in construction and economical to manufacture. Still another object is to provide a collet which is highly compact so as to permit work in confined spaces.

These and other objects and advantages will become apparent hereinafter.

The invention is embodied in a collet having a body provided with a threaded end portion and flexible jaws having tapered external faces. An annular element fits over the tapered faces so that when the threaded end portion is threaded into the drive head of a power tool, the annular element will be interposed between the drive head and the tapered faces. The body threads further into the drive head responsive to relative rotation between the body and drive head, thereby causing the annular element to shift forward on the tapered surfaces and urge the jaws together.

The invention also consists in the parts and in the arrangements and combinations of parts hereinafter described and claimed. In the accompanying drawings which form part of the specification and wherein like numerals and letters refer to like parts wherever they occur:

Figure 1:
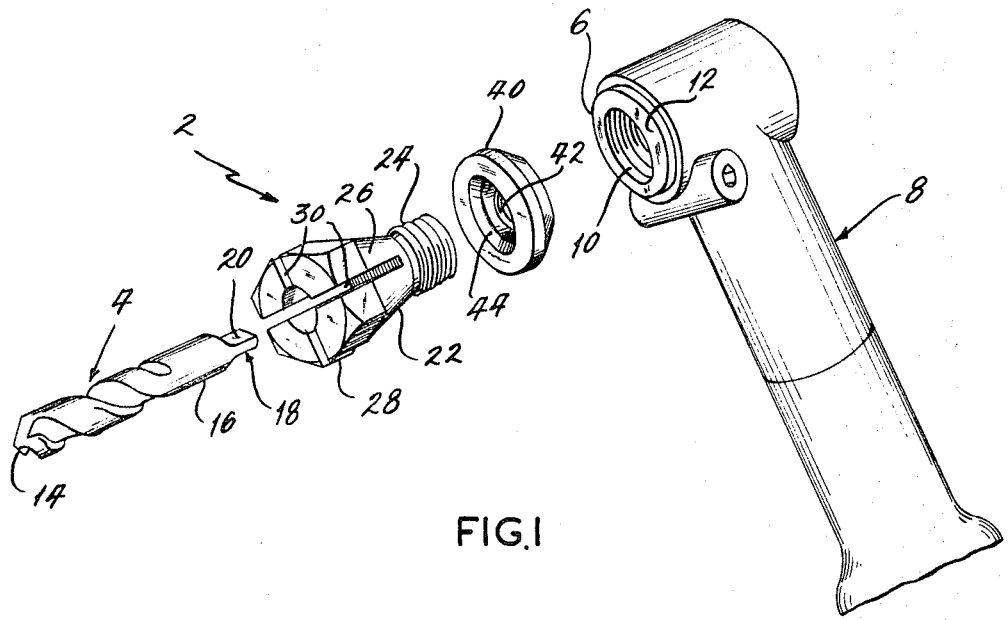
FIG. 1 is an exploded perspective view of a power tool equipped with the collet attachment of this invention.
Figures 2, 3:
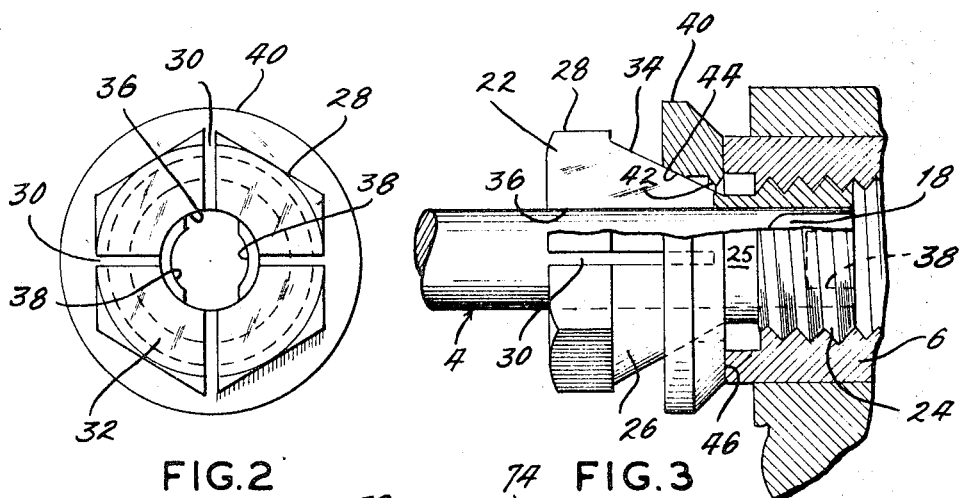
FIG. 2 is a greatly enlarged end view of the collet.
FIG. 3 is a side view, partially broken away and in section, of the collet of FIG. 2.

Referring now to the drawings in detail, 2 designates a collet for holding a rotatable tool 4 in the rotatable drive head 6 of a power tool 8, which can be of the angle drive variety as illustrated in FIG. 1, or of the axial drive variety which is well known. Similarly, it may be portable or stationary, depending on the location, size and composition of the workpiece. The drive head 6 is provided with an outwardly opening threaded bore 10 and an outwardly presented planar abutment face 12. The rotatable tool 4 is conventional and includes a cutting tip 14, a cylindrical shank 16, and a rearwardly projecting tang 18 defined in part by parallel lands 20.

The collet 2 includes a body 22 preferably formed as an integral unit from a hardened tempered steel and having a threaded rear end portion 24, the threads of which are cut to engage the threads of the threaded bore 10. The threads of collet portion 24 run off into an annular relief 25, and such relief merges into an outwardly tapered intermediate portion 26 which, in turn, merges into a forward end portion 28 having flat tool faces hexagonally arranged to fit a standard wrench. The body 22 is provided with radial cross slots 30 which terminate in close proximity to the undercut relief portion 25, thereby dividing the forward end portion 28 and the intermediate portion 26 into a plurality of peripherally arranged jaws 32 having tapered external faces 34. The tapered surfaces 34 of adjacent jaws 32 form a substantially continuous frusto-conical surface on the body 22. The body 22 is further provided with an axially extending bore or tool receiving socket 36 sized for reception of the shank 16 on the rotatable tool 4. Within the rear end portion 24 a pair of arcuate lugs 38 project into the bore 36, and at no point are the lugs 38 closer than the distance between the lands 20 of the tang 18. Accordingly, the tang 18 will slide rearwardly between the lugs 38, but when the tool 4 is turned, its lands 20 will engage the lugs 38 so that it is precluded from rotating with respect to the collet 2. Thus, the lugs 38 create a socket at the end of the bore and that socket non-rotatively receives the tang 18.

The collet 2 is equipped with a jaw camming or closing ring 40 having threaded aperture 42, the threads of which are sized to engage the threads on the rear end portion 24 of the body 22. At its forward end the aperture 42 flares outwardly in the provision of an inwardly presented conically tapered surface 44 having an angle of taper which is slightly less than that of the tapered external surfaces 34 on the jaws 32 so that the faces 34 and 44 will engage one another along the forward edge of the latter. At its rear end the ring 40 is provided with a planar abutment surface 46.

In use, the threads of the threaded aperture 42 in the ring 40 are engaged with the threads on the rear end portion 24 of the body 22, and the ring 40 is threaded completely across the rear end portion 24. When the ring 40 passes off the forward end of the rear end portion 24, the relief zone 25 releases it so its inwardly presented tapered face 44 will engage the tapered external faces 34 on the jaws 32. The smallest radii on the tapered faces 34 and 44, as well as the axial thickness of the ring 40, are all such that the ring 40 will be completely free of the threads on the end portion 24 when the tapered faces 34 and 44 are in engagement. Nevertheless, by reason of the threaded aperture 42, the ring 40 remains captured on the body 22 and therefore cannot be misplaced. Thereafter the rear end portion 24 is threaded into the bore 10 of the drive head 6 until the planar abutment surface 46 on the ring 40 comes up to the planar abutment face 12 on the drive head 6. At this point further advancement of the body 20 into the drive head 6 is halted. Next, the tang end of the tool 4 is inserted into the axial bore 36 and is twisted so that the tang 18 fits between the lugs 38 located within the rear end portion 24. When this occurs, the drill 4 is fully inserted within the collet 2, and the jaws 32 will be disposed around the shank 16 of the tool 4. Thereafter, the forward end portion 28 is turned manually as far as it is comfortably possible in a direction which causes further advancement of the body 22 into the drive head 6. At this point the ring 40 will be snugly interposed between the abutment face 12 on the drive head 6 and the tapered faces 34 on the body 22, and the power tool 8 with rotatable tool 4 in it is ready for use in a boring or similar operation.

When the drive head 6 is energized and the cutting tip 14 of the tool 4 is brought against a workpiece (not shown), the rotating tool 4 will encounter a limited amount of resistance which will be transmitted to the body 22 through the tang 18 and the lugs 38. This causes the rear end portion 24 of the body 22 to thread still further into the bore 10 so that the end face 12 of the drive head 6 forces the ring 40 forwardly on the tapered surface 24 of the intermediate portion 26 of the body 22. Since the inwardly present tapered face 44 of the ring 40 embraces the external tapered faces 34 of the body 22, this further advancement urges or cams the jaws 32 together in unison, causing the arcuate surfaces of the bore 36 to grip the shank 16 of the tool 4 with even greater force. In this connection, it should be noted that the direction of rotation for the tool 4, the spiral of the threads on the rear end portion 24, and the rotation of the drive head 6 should be all in the same direction so that the body 22 will thread into the drive head 6 when the tool 4 encounters resistance. In other words, if the tool 4 is a right-hand twist drill, then the threads on the end portion 24 should be of the right-hand variety and the drive head 6 should rotate clockwise when observed from the rear of the power tool 8.

It is quite apparent from the foregoing that the collet 2 is self-tightening, no special wrenches being necessary to lock the tool 4 within it. Moreover, the tool 4 is accurately centered with respect to the drive head 6 upon insertion into the bore 36. Collet 2 is also extremely simple in construction, having few bearing surfaces at which wear can occur. Finally, collet 2 is quite compact so as not to unduly obstruct the operator's vision or interfere with nearby objects when used in confined spaces.

To remove the rotatable tool 4 from the collet 2, a standard wrench is applied to the faces of the forward end portion 28 and turned in a direction opposite the normal direction of rotation for the drive head 6.

Figure 4:
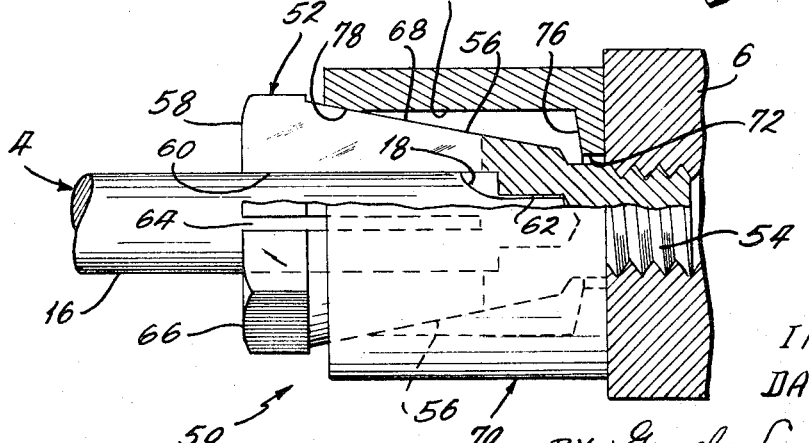
FIG. 4 is a side view, partially broken away and in section, of a modified collet useful in power tools.

Referring now to FIG. 4, it is possible to provide a modified collet 50 including a body 52 having a threaded rear end portion 54, the threads on which are cut for engagement with the threaded bore 10 of the drive head 6. The body 52 further includes a tapered intermediate portion 56 and a hexagonal forward end portion 58, through which an axial bore or tool-receiving socket 60 extends. The bore 60 terminates within the intermediate portion 56 immediately forward of the rear end portion 54 where a pair of opposed lugs 62 project into it, the lugs 62 being spaced sufficiently for reception of the tang 18 on the tool 4. Both the hexagonal end portion 58 and the intermediate portion 56 are provided with cross slots 64 which terminate within the intermediate portion slightly forwardly of the lugs 62 therein. The slots 74, in effect, define a plurality of jaws 66, having tapered external faces 68. The external faces 68 of adjacent jaws 66 are substantially continuous and together form a frusto-conical surface on the body 52.

Encircling substantially the entire intermediate portion 56 is a camming collar 70 provided at its rear end with a rear bore 72 which forwardly opens into a diametrically enlarged forward bore 74 at a shoulder 76. At its forward end the forward bore 74 flares outwardly in the formation of an inwardly presented tapered face 78 which conforms to the taper of and engages the tapered external face 68 on the jaws 66 slightly to the rear of the hexagonal end portion 56. The rear bore 72 slidably receives and encircles the threaded rear end portion 54, while the shoulder 76 is disposed slightly to the rear of the rear annular end face on the intermediate portion 56.

The collet 50 is used and functions in a manner similar to that of the collet 2 previously described and by the same token offers similar advantages. It can, however, be used with tools 4 having larger shanks 16, inasmuch as the diameter of the axial bore 60 is not restricted by the diameter of the threaded rear end portion 54, as is the case with collet 2.

It should be understood that collets 2 and 60 can be used with other rotatable tools 4 aside from the twist drill illustrated. Moreover, it is immaterial whether the spindle 6 rotates and the workpiece remains stationary or vice-versa.

This invention is intended to cover all changes and modifications of the example of the invention herein chosen for purposes of the disclosure which do not constitute departures from the spirit and scope of the invention.

What is claimed is:

1. In a machine having a mounting head provided with a threaded bore and adapted to impart relative rotation between a workpiece and a tool having a shank provided with a noncircular end portion; a collet connecting the tool with the mounting head and comprising a body having jaws arranged about and defining an outwardly opening bore which extends into the body and terminates at a noncircular socket therein, the bore being sized to slidably accept the shank of the tool and the socket being configured to receive the noncircular end portion on the tool shank and prevent rotation of the tool relative to the body, the body also having a tapered external surface extending along the jaws and spreading outwardly in the direction of the open end of the tool receiving bore, the body further having a threaded end portion formed integral with the jaws and located beyond the reduced end of the tapered surface so that the jaws are connected to one another through the end portion, the threads on the end portion being engageable with the threads in the mounting head bore and both sets of threads being oriented such that any relative rotation between the body and the mounting head caused by the tool engaging the workpiece will cause the body to advance into the threaded bore of the mounting head, and a jaw closing element encircling the body and engaging the tapered surface at the jaws, the jaw closing element further extending between the tapered surface and the mounting head and being shiftable axially along the body, whereby when the end portion of the body advances further into the threaded bore of the mounting head, due to relative rotation between the body and the mounting head, the jaw closing element will advance along the tapered surface and cam the jaws inwardly so that they more tightly engage the shank of the tool.

2. A structure according to claim 1 wherein the tapered surface possesses a frusto-conical configuration.

3. A structure according to claim 1 wherein the end of the tapered surface closest to the threaded end portion is smaller in diameter than the threads on the threaded end portion; and wherein the jaw closing element has a threaded hole which threads over the threaded end portion, whereby the jaw closing element once it is threaded across the end portion toward the tapered surface is captured on the body.

4. A structure according to claim 1 wherein the body is provided with a diametrically reduced relief at the end of the threaded portion and adjacent to the tapered section; wherein the jaw closing element has a threaded hole which threads over the end portion; and wherein the threaded portion of the hole is disposed within the relief and is free of the threads on the end portion when the jaw closing element engages the tapered surface, whereby the jaw closing element is captured on the body.

5. A structure according to claim 1 wherein the tool receiving bore and the shank are cylindrical.

6. A structure according to claim 5 wherein the non-circular portion of the tool is a tang formed at the end of the shank; and wherein the socket at the end of the bore is formed by lugs projecting into the bore and preventing rotation of the tang in the body.

7. A structure according to claim 1 wherein the end socket is disposed in part within the end portion, and wherein the jaw closing element is a ring sized to fit over and beyond the end portion in encircling relation to the frusto-conical surface on the jaws.

8. A structure according to claim 1 wherein the end socket is disposed within the body forwardly of the threaded end portion, and wherein the jaw closing element comprises a collar which encircles and bears against the frusto-conical surface on the jaws.

References Cited

UNITED STATES PATENTS

| | | | |
|---|---|---|---|
| 1,114,653 | 10/1914 | Starin | 279—52 |
| 2,242,475 | 5/1941 | Misuraca | 279—43 XR |

FOREIGN PATENTS

| | | |
|---|---|---|
| 551,065 | 1943 | Great Britain. |

ROBERT C. RIORDON, Primary Examiner

D. D. EVENSON, Assistant Examiner